(12) United States Patent
Kriofske

(10) Patent No.: US 11,391,933 B2
(45) Date of Patent: Jul. 19, 2022

(54) OPTICAL ADAPTER SYSTEM

(71) Applicant: VIAVI Solutions Inc., San Jose, CA (US)

(72) Inventor: Peter Kriofske, Seattle, WA (US)

(73) Assignee: VIAVI Solutions Inc., San Jose, CA (US)

( * ) Notice: Subject to any disclaimer, the term of this patent is extended or adjusted under 35 U.S.C. 154(b) by 72 days.

(21) Appl. No.: 16/137,113

(22) Filed: Sep. 20, 2018

(65) Prior Publication Data

US 2020/0096751 A1 Mar. 26, 2020

(51) Int. Cl.
| G02B 21/00 | (2006.01) |
| G02B 6/44 | (2006.01) |
| G02B 6/38 | (2006.01) |
| G02B 7/24 | (2021.01) |

(52) U.S. Cl.
CPC ....... *G02B 21/0004* (2013.01); *G02B 6/3807* (2013.01); *G02B 6/4486* (2013.01); *G02B 7/24* (2013.01)

(58) Field of Classification Search
CPC .. G02B 21/0028; G02B 21/0032; G02B 6/00; G02B 6/3807
See application file for complete search history.

(56) References Cited

U.S. PATENT DOCUMENTS

| 7,311,526 | B2* | 12/2007 | Rohrbach | G06F 1/18 439/39 |
| 9,869,826 | B1* | 1/2018 | Shang | G02B 6/3873 |
| 2008/0175584 | A1* | 7/2008 | Ohkuma | G03B 9/10 396/458 |
| 2013/0136400 | A1* | 5/2013 | Isenhour | G02B 6/4214 385/79 |
| 2014/0107665 | A1* | 4/2014 | Shellenberger | A61B 34/37 606/130 |
| 2014/0268114 | A1* | 9/2014 | Zhou | B08B 1/00 356/73.1 |
| 2017/0184801 | A1* | 6/2017 | Isenhour | G02B 6/4214 |
| 2019/0076199 | A1* | 3/2019 | Kline | A61B 34/20 |

FOREIGN PATENT DOCUMENTS

EP 3220173 A1 * 9/2017 ........... G02B 6/4204

OTHER PUBLICATIONS

FiBO® Interferometers, "Specialized Fiber Optic Endface Testing", https://www.prometoptics.com/products/, Jan. 17, 2018, 5 pages.
Norland Products, "GL16—AiO Interferometer", https://www.norlandprod.com/fiberoptic/GL16.html, Mar. 14, 2018, 6 pages.

* cited by examiner

*Primary Examiner* — Christopher Stanford
*Assistant Examiner* — Journey F Sumlar
(74) *Attorney, Agent, or Firm* — Harrity & Harrity, LLP

(57) ABSTRACT

An optical adapter system may comprise a mounting plate. The mounting plate may include a set of magnets associated with: mechanically connecting the mounting plate and an optical adapter of the optical adapter system, and facilitating movement of the optical adapter between multiple positions associated with different optical fiber polishes. The optical adapter system may comprise the optical adapter. The optical adapter may include a set of structures associated with the set of magnets. The optical adapter may include an optical tip connector associated with mechanically connecting the optical adapter system and an optical cable.

20 Claims, 6 Drawing Sheets

OPTICAL ADAPTER SYSTEM

BACKGROUND

A microscope may include an instrument used to see objects that are too small to be seen by the naked eye. Microscopy may include investigating small objects and structures using a microscope. A microscope may include an optical microscope, which uses light passed through a sample to produce an image, a fluorescence microscope, an electron microscope, a scanning probe microscope, and/or the like. In some cases, a microscope may be used to analyze optical fibers of an optical cable.

SUMMARY

An optical adapter system, comprising: a mounting plate, wherein the mounting plate includes a set of magnets associated with: mechanically connecting the mounting plate and an optical adapter of the optical adapter system, and facilitating movement of the optical adapter between multiple positions associated with different optical fiber polishes; and the optical adapter, wherein the optical adapter includes a set of structures associated with the set of magnets, wherein the optical adapter includes an optical tip connector associated with mechanically connecting the optical adapter system and an optical cable.

A mounting plate, comprising: a set of disk magnets, wherein the set of disk magnets is associated with mechanically connecting the mounting plate and an optical adapter; a set of pivot magnets, wherein the set of pivot magnets is associated with facilitating movement of the optical adapter between multiple positions associated with different optical fiber polishes; and a cutout, wherein the cutout is associated with: facilitating pass through of an optical connector of an optical cable, or facilitating analysis of the optical cable by an optical cable microscope.

An optical adapter, comprising: a set of metal plates, wherein the set of metal plates is associated with magnetically connecting the optical adapter and a mounting plate; a set of metal recesses, wherein the set of metal recesses is associated with facilitating movement of the optical adapter between multiple positions associated with different optical fiber polishes; and an optical tip connector, wherein the optical tip connector is associated with mechanically connecting the optical adapter and an optical cable.

DETAILED DESCRIPTION

The following detailed description of example implementations refers to the accompanying drawings. The same reference numbers in different drawings may identify the same or similar elements.

An optical cable microscope may be used to inspect and/or analyze optical fibers of an optical cable. For example, an optical cable microscope may be used to inspect an end of the optical fibers of the optical cable. Different optical adapter systems may need to be interchanged with respect to the optical cable microscope to inspect optical cables with different optical connectors, optical cables with optical fibers that have different fiber polishes, and/or the like. Interchanging different optical adapter systems may consume significant time and/or may delay an analysis and/or an inspection of optical fibers of an optical cable. In addition, these different optical adapter systems may include fastening mechanisms, such as screws, thread fasteners, and/or the like, which may further consume time related to interchanging optical adapter systems. Further, manufacturing multiple types of optical adapter systems for different optical cables can be complicated, thereby increasing costs related to manufacturing optical adapter systems for an optical cable microscope, decreasing a reliability of results obtained using multiple types of optical adapter systems manufactured by different manufacturers, and/or the like.

Some implementations described herein provide an optical adapter system that includes various components that facilitate use of the optical adapter system with different optical cables that have different optical connectors, that have optical fibers with different fiber polishes, and/or the like. In addition, some implementations described herein provide an optical adapter system that includes various components that facilitate quick interchange of the optical adapter system with another optical adapter system for an optical cable microscope. In this way, the optical adapter system reduces or eliminates a need to use different optical adapter systems for different optical cables that have different optical connectors and/or that have optical fibers with different fiber polishes. This reduces or eliminates a need to swap optical adapter systems in and out to inspect and/or analyze different optical cables, thereby conserving time that would otherwise be consumed swapping optical adapter systems in and out. In addition, this facilitates quick interchange when an optical adapter system needs to be swapped out for another optical adapter system, thereby conserving time associated with swapping out one optical adapter system for another optical adapter system. Further, this facilitates manufacturing of optical adapter systems by a single manufacturer, thereby improving a use of an optical adapter system, improving compatibility of the optical adapter system with an optical cable microscope, and/or the like.

Figure 1:
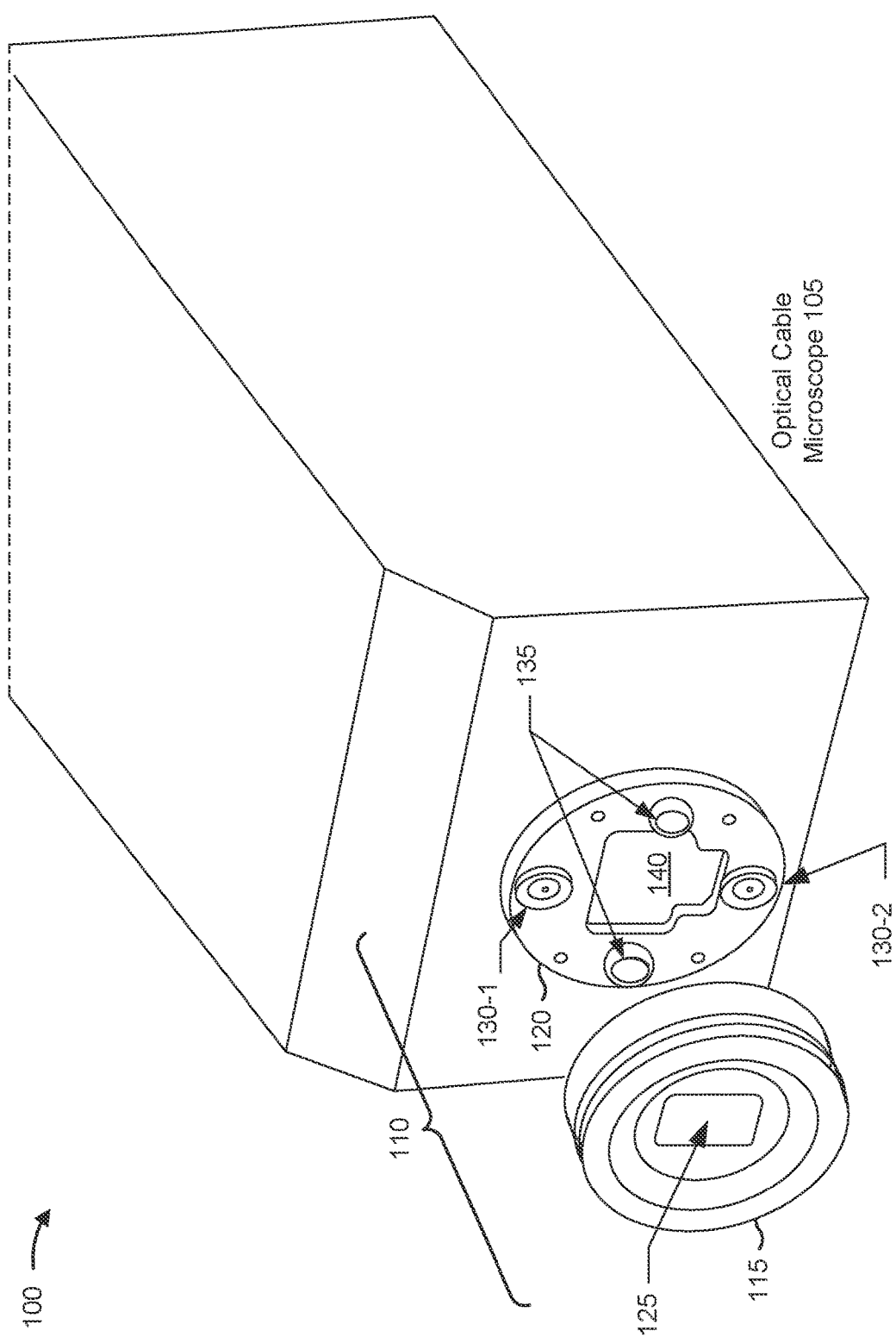
FIG. 1 is a diagram of an overview of an example implementation described herein.

FIG. 1 is a diagram of an overview of an example implementation 100 described herein. As shown in FIG. 1, implementation 100 includes an optical cable microscope 105. For example, the optical cable microscope 105 may include a microscope (e.g., a table-top microscope or a hand-held microscope) that is used to analyze optical fibers of an optical cable. Continuing with the previous example, the optical cable microscope 105 may include an optical probe, an optical fiber microscope, a fault locator, an optical fiber inspection microscope, and/or the like.

As further shown in FIG. 1, implementation 100 includes an optical adapter system 110. For example, the optical adapter system 110 may include an optical adapter 115 and a mounting plate 120. Continuing with the previous example, the optical adapter 115 may be used to connect an optical cable to the optical cable microscope 105 and may be mechanically connected to the mounting plate 120, which may be mechanically connected to the optical cable microscope 105 (e.g., via glue, welding, screws, bolts, and/or the like), as described in more detail elsewhere herein.

As further shown in FIG. 1, the optical adapter 115 may include an optical tip connector 125. In some implementations, the optical tip connector 125 may facilitate connection of an optical cable to optical adapter system 110 (and optical adapter 115, specifically) via an optical connector associated with the optical cable. In some implementations, the optical tip connector 125 may be interchangeable with one or more other optical tip connectors 125. This facilitates adaption of the optical adapter system 110 (and optical adapter 115, specifically) for various differently configured optical connectors without replacing the optical adapter system 110 and/or the optical adapter 115. This conserves time that would otherwise be consumed interchanging optical adapter system 110 (or optical adapter 115, specifically) for different optical cables that include different optical connectors. In addition, this conserves costs associated with having multiple types of optical adapter systems 110 (or optical adapters 115, specifically) for different optical cables with different optical connectors.

As further shown in FIG. 1, the mounting plate 120 of the optical adapter system 110 may include a set of disk magnets 130 (e.g., disk magnets 130-1 and 130-2). In some implementations, the set of disk magnets 130 may be associated with mechanically connecting the optical adapter 115 to the mounting plate 120. For example, the set of disk magnets 130 may magnetically connect to a metal plate associated with the optical adapter 115 (e.g., located on a back side of the optical adapter 115) to mechanically connect the optical adapter 115 to the mounting plate 120, as described elsewhere herein. Additionally, or alternatively, the set of disk magnets 130 may be associated with facilitating movement of the optical adapter 115 between multiple positions associated with different optical fiber polishes. For example, a first metal plate associated with the optical adapter 115 may be magnetically connected to the disk magnet 130-1 when in a first position of the multiple positions, and a second metal plate associated with the optical adapter 115 may be magnetically connected to the disk magnet 130-2 when in a second position of the multiple positions, as described elsewhere herein. In some implementations, the set of disk magnets 130 may be in another shape. For example, the set of disk magnets 130 may be in the shape of a square, a rectangle, a sphere, a triangle, and/or the like.

As further shown in FIG. 1, the mounting plate 120 of the optical adapter system 110 may include a set of sphere magnets 135 (e.g., shown as a pair of sphere magnets 135). In some implementations, the set of sphere magnets 135 may be associated with mechanically connecting the optical adapter 115 to the mounting plate 120 of the optical adapter system 110. For example, a respective portion of a metal plate associated with the optical adapter 115 may magnetically connect to the set of sphere magnets 135 to mechanically connect the optical adapter 115 to the mounting plate 120. Additionally, or alternatively, the set of sphere magnets 135 may be associated with facilitating movement of the optical adapter 115 between multiple positions associated with different optical fiber polishes. For example, rounded surfaces of the set of sphere magnets 135 may facilitate movement of the optical adapter 115 between the multiple positions, as described elsewhere herein. In some implementations, the set of sphere magnets 135 may be in another shape. For example, the set of sphere magnets 135 may be in the shape of a hemisphere, a cylinder, a geodesic sphere, and/or the like.

As further shown in FIG. 1, the mounting plate 120 may include a cutout 140. For example, the cutout 140 may facilitate analysis of an optical cable by the optical cable microscope 105 when the optical cable is mechanically connected to the optical tip connector 125 of the optical adapter 115. For example, the cutout 140 may facilitate the analysis by providing an unobstructed field of view of the optical cable connected to the optical adapter 115.

Although FIG. 1 was described as including various sets of magnets to mechanically connect the optical adapter 115 and the mounting plate 120, to facilitate movement of the optical adapter 115 into multiple positions via pivoting on a set of sphere magnets (e.g., to reduce setup time and/or a quantity of optical adapters 115 that is needed), to provide a quick change optical adapter 115, and/or the like, the implementations apply equally to different types of attachment structures other than magnets. For example, rather than including various sets of magnets, the optical adapter 115 and the mounting plate 120 may include various sets of hook-and-loop fasteners, press-fit connectors, snap connectors, and/or the like.

In this way, the optical adapter system 110 provides a device that can be quickly and/or efficiently reconfigured for various optical cables (e.g., via movement of one or more components of the optical adapter system 110 on a set of sphere magnets, via interchanging of one or more components of the optical adapter system 110, via quick change of the optical adapter 115, and/or the like). This reduces or eliminates a need to use multiple optical adapter systems 110 for the various optical cables, thereby conserving costs associated with using multiple optical adapter systems 110, thereby reducing a complexity of reconfiguring an optical cable microscope 105 for use with different optical cables, and/or the like. In addition, this reduces an amount of time needed to reconfigure the optical cable microscope 105 and/or the optical adapter system 110 for use with different optical cables, thereby improving an efficiency of analyzing multiple optical cables with different polishes and/or optical connectors, thereby improving a throughput of a technician with regard to a quantity of optical cables of different configurations that the technician can analyze within a period of time, and/or the like. Further, the configuration of components of the optical adapter system 110 described herein minimizes or eliminates a need for movable mechanical components (e.g., a hinge) to facilitate the functions described herein. This increases an expected useful life of the optical adapter system 110 relative to another optical adapter system 110 that includes movable mechanical components by minimizing or eliminating a risk of mechanical failure that would otherwise be associated with the movable mechanical components.

As indicated above, FIG. 1 are provided merely as an example. Other examples are possible and may differ from what was described with regard to FIG. 1. In practice, there may be additional components, fewer components, different components, or differently arranged components than those shown in FIG. 1.

Figure 2:
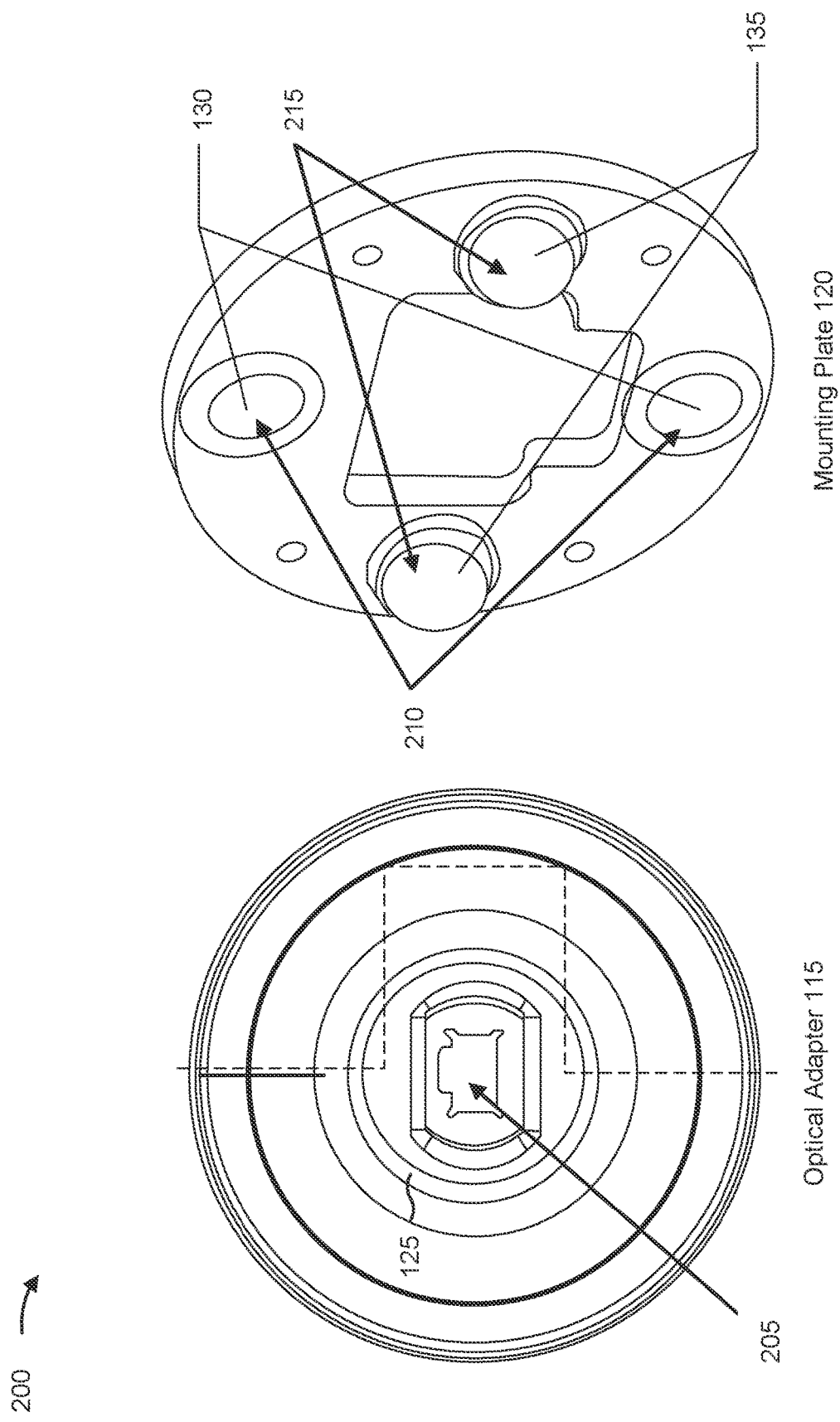
FIG. 2 is a diagram of an example implementation related to an optical adapter system described herein.

FIG. 2 is a diagram of an example implementation 200 related to an optical adapter system described herein. FIG. 2 shows a front view of an optical adapter 115 and an angled front view of a mounting plate 120.

As shown in FIG. 2, an optical tip connector 125 may include a cutout 205. In some implementations, the cutout 205 may be similar to a cutout 140 of the mounting plate 120. For example, the cutout 205 may facilitate analysis of an optical cable by providing, in combination with the cutout 140, an unobstructed field of view of an end of the optical cable by an optical cable microscope 105 (not shown). Continuing with the previous example, when the optical adapter 115 is mechanically connected to the mounting plate 120, the cutout 140 and the cutout 205 may be aligned to provide the optical cable microscope 105 with the unobstructed field of view of the end of the optical cable.

In some implementations, a shape of the cutout 205 may depend on a shape of an optical connector to be inserted into the cutout 205. For example, the shape of the cutout 205 may match the shape of the optical connector to be inserted into the cutout 205. In some implementations, a user of optical adapter 115 may interchange an optical tip connector 125 for another optical tip connector 125 that includes a differently shaped cutout 205 to accommodate an optical cable that includes a differently shaped optical connector.

As further shown in FIG. 2, and as shown by reference numbers 210 and 215, a set of disk magnets 130 and a set of sphere magnets 135 may be located on opposite sides of the cutout 140. For example, the set of disk magnets 130 shown in FIG. 2 includes two disk magnets 130 located on opposite sides of the cutout 140. Continuing with the previous example, the set of sphere magnets 135 shown in FIG. 2 includes two sphere magnets 135 located on opposite sides of the cutout 140 and perpendicular to the two disk magnets 130. This configuration of magnets of optical adapter system 110 may facilitate proper alignment of the optical adapter 115 and the mounting plate 120, may help to ensure that the optical adapter 115 and the mounting plate 120 are securely connected to each other, may facilitate movement of the optical adapter 115 (e.g., may facilitate pivot of the optical adapter 115 about an axis aligned with the set of sphere magnets 135), and/or the like. In some implementations, the optical adapter 115 and the mounting plate 120 may include a set of key structures to perform similar functions, as described elsewhere herein.

As indicated above, FIG. 2 is provided merely as an example. Other examples are possible and may differ from what was described with regard to FIG. 2. In practice, there may be additional components, fewer components, different components, or differently arranged components than those shown in FIG. 2.

Figure 3:
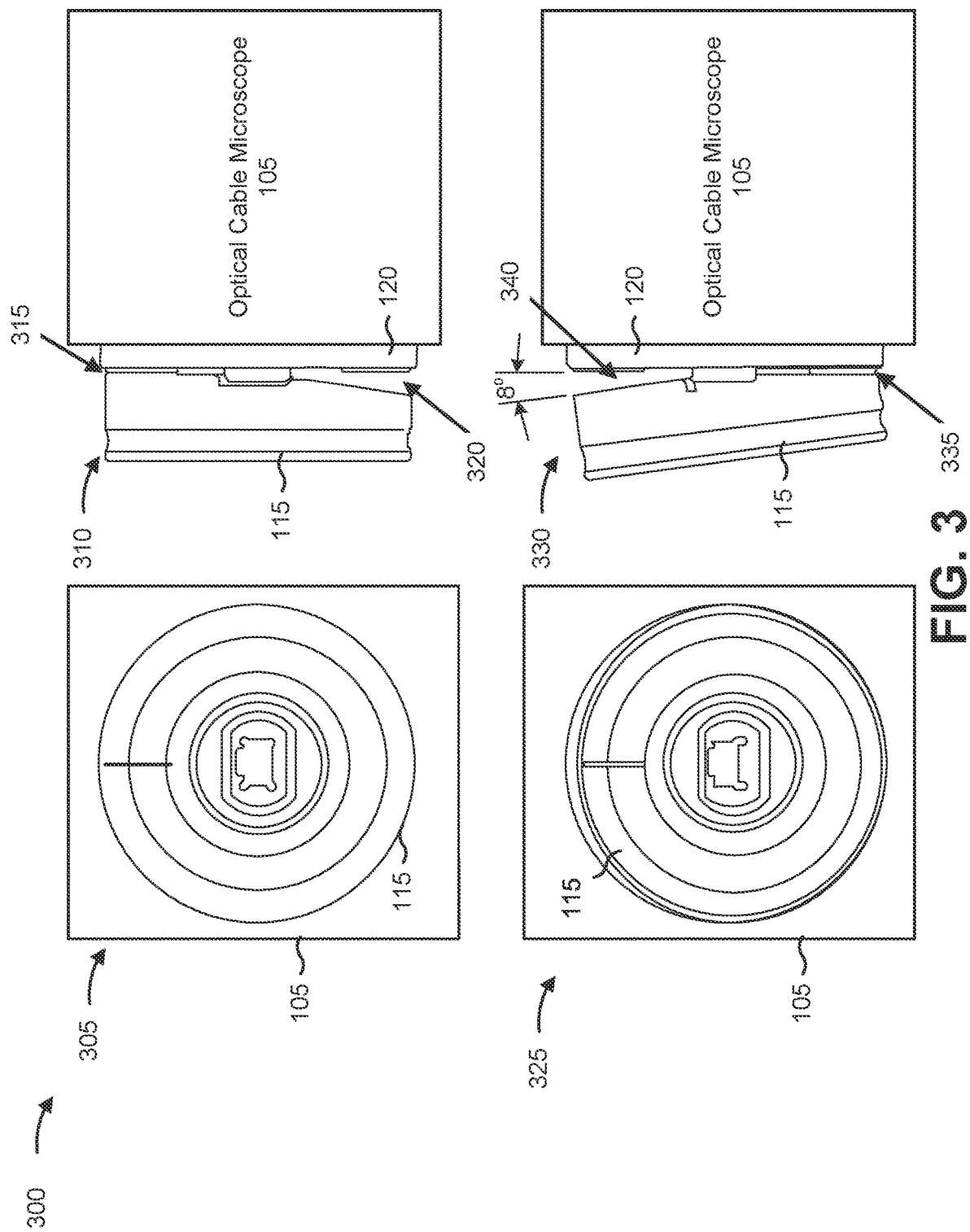
FIG. 3 is a diagram of an example implementation related to an optical adapter system described herein.

FIG. 3 is a diagram of an example implementation 300 related to an optical adapter system described herein. FIG. 3 shows various views of an optical adapter 115 in different positions relative to mounting plate 120.

Reference number 305 shows a front view of the optical adapter 115, as mechanically connected to the mounting plate 120 on an optical cable microscope 105. As further shown by reference number 305, the optical adapter 115 may be in a first position associated with a first optical fiber polish. For example, the first position of the optical adapter 115 may be associated with a flat optical fiber polish. The positioning of the optical adapter 115 relative to the mounting plate 120 is described in more detail below.

Reference number 310 shows a side view of the first position of the optical adapter 115 described with regard to reference number 305. As shown by reference number 315, when in the first position, a first metal plate on a back side of the optical adapter 115 may be magnetically connected to a first disk magnet 130 (e.g., disk magnet 130-1 described elsewhere herein). By being connected to the first disk magnet 130, the optical adapter 115 may be aligned with the mounting plate 120 in a straight manner. As shown by reference number 320, when in the first position, a second metal plate on the back side of the optical adapter 115 may not contact a second disk magnet 130 (e.g., disk magnet 130-2 described elsewhere herein) based on being aligned at an angle to the first metal plate.

Reference number 325 shows a front view of the optical adapter 115, as mechanically connected to the mounting plate 120 on the optical cable microscope 105. As further shown by reference number 325, the optical adapter 115 may be in a second position associated with a second optical fiber polish. For example, the second position of the optical adapter 115 may be associated with an angled optical fiber polish. The positioning of the optical adapter 115 relative to the mounting plate 120 is described in more detail below.

Reference number 330 shows a side view of the second position of the optical adapter 115 described with regard to reference number 325. As shown by reference number 335, when in the second position, the second metal plate on the back side of the optical adapter 115 may be magnetically connected to the second disk magnet 130 (e.g., disk magnet 130-2 described elsewhere herein). By being connected to the second disk magnet 130, the optical adapter 115 may be aligned with the mounting plate 120 in an angled manner. As shown by reference number 340, when in the second position, the first metal plate on the back side of the optical adapter 115 may not contact the first disk magnet 130 (e.g., disk magnet 130-1 described elsewhere herein) based on being aligned at an angle to the second metal plate.

In some implementations, an angle of movement between the first position and the second position may depend on an angle by which the first metal plate and the second metal plate are offset from each other. In some implementations, the angle by which the first metal plate and the second metal plate are offset from each other may match an angle difference between a flat fiber polish and an angled fiber polish. For example, if an angle difference between a flat fiber polish and an angled fiber polish is eight degrees (or another angle), then the first metal plate and the second metal plate may be configured such that the optical adapter 115 can pivot about an axis by approximately eight degrees (or by a threshold amount) between the first position to the second position.

As indicated above, FIG. 3 is provided merely as an example. Other examples are possible and may differ from what was described with regard to FIG. 3. In practice, there may be additional components, fewer components, different components, or differently arranged components than those shown in FIG. 3.

Figure 4:
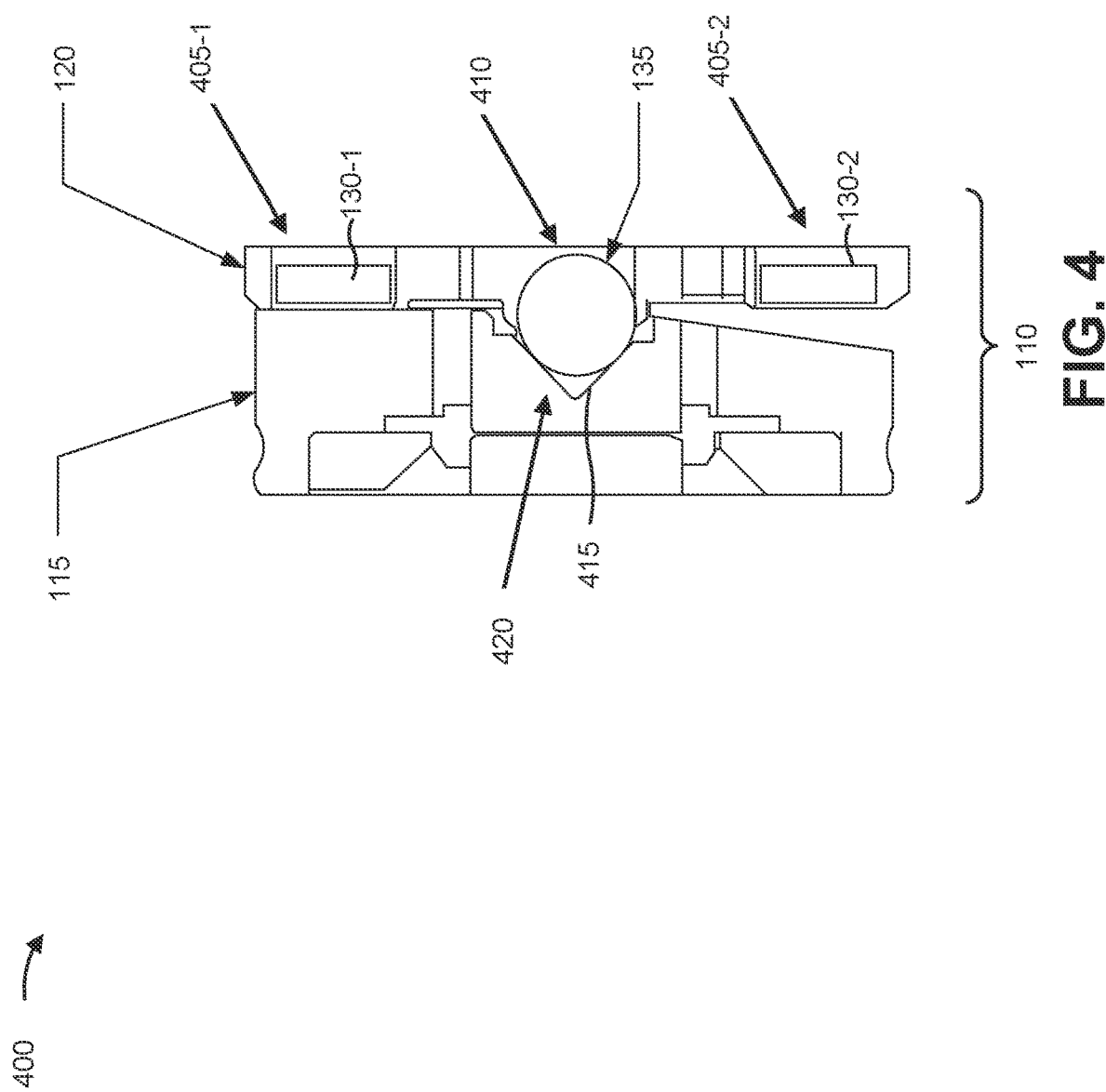
FIG. 4 is a diagram of an example implementation related to an optical adapter system described herein.

FIG. 4 is a diagram of an example implementation 400 related to an optical adapter system described herein. FIG. 4 shows a cross-sectional view of an optical adapter system 110.

As shown by reference numbers 405-1 and 405-2, disk magnets 130-1 and 103-2 may be recessed within a mounting plate 120 of the optical adapter system 110. This may provide protection to the disk magnets 130-1 and 130-2 from impact with an optical adapter 115 of the optical adapter system 110 due to movement of the optical adapter 115 between multiple positions, thereby reducing or eliminating wear and tear on the disk magnets 130-1 and 130-2, thereby increasing a usable life of the disk magnets 130-1 and 130-2, and/or the like.

As shown by reference number 410, the mounting plate 120 may include a respective recess for a set of sphere magnets 135 included in the mounting plate 120. For example, the respective recess may mechanically secure the set of sphere magnets 130 within the mounting plate 120, may facilitate use of the set of sphere magnets 130 as structures about which the optical adapter 115 can move into different positions (e.g., by causing a respective portion of the set of sphere magnets 135 to be exposed above a surface of the mounting plate 120), and/or the like. Continuing with the previous example, and as further shown in FIG. 4, a recess may have a depth that facilitates approximately half of a diameter of a sphere magnet 135 to be within the recess. In the case that a set of magnets with another shape is used, a respective recess for the set of magnets may be configured in a similar manner.

As shown by reference number 415, the optical adapter 115 may include a respective metal recess for a set of sphere magnets 135 included in the mounting plate 120. For example, the respective metal recess may facilitate mechanical connection between the optical adapter 115 and the mounting plate 120 via magnetic connection to the set of sphere magnets 135. As shown by reference number 420, when the optical adapter 115 and the mounting plate 120 are mechanically connected to each other, the set of sphere magnets 135 may be located within the respective metal recess. In some implementations, the set of sphere magnets 135 may be located within the respective metal recess up to a particular depth. For example, the respective metal recess may have a depth that facilitates movement (e.g., pivot about an axis) of the optical adapter 115 about the set of sphere magnets 135. Continuing with the previous example, and as further shown in FIG. 4, a metal recess may have a depth that facilitates approximately half of a diameter of a sphere magnet 135 to be within the metal recess.

In some implementations, the respective metal recess may facilitate connection of the optical adapter 115 to the mounting plate 120 via a magnetic connection between the respective metal recess and the set of sphere magnets 135. In some implementations, the optical adapter 115 may include a set of attachment structures other than a set of metal recesses. For example, if the mounting plate 120 includes male-configured or female-configured snap connectors as attachment structures, then the optical adapter 115 may include corresponding female-configured or male-configured snap connectors to mate with the male-configured or the female-configured snap connectors.

As indicated above, FIG. 4 is provided merely as an example. Other examples are possible and may differ from what was described with regard to FIG. 4. In practice, there may be additional components, fewer components, different components, or differently arranged components than those shown in FIG. 4.

Figure 5:
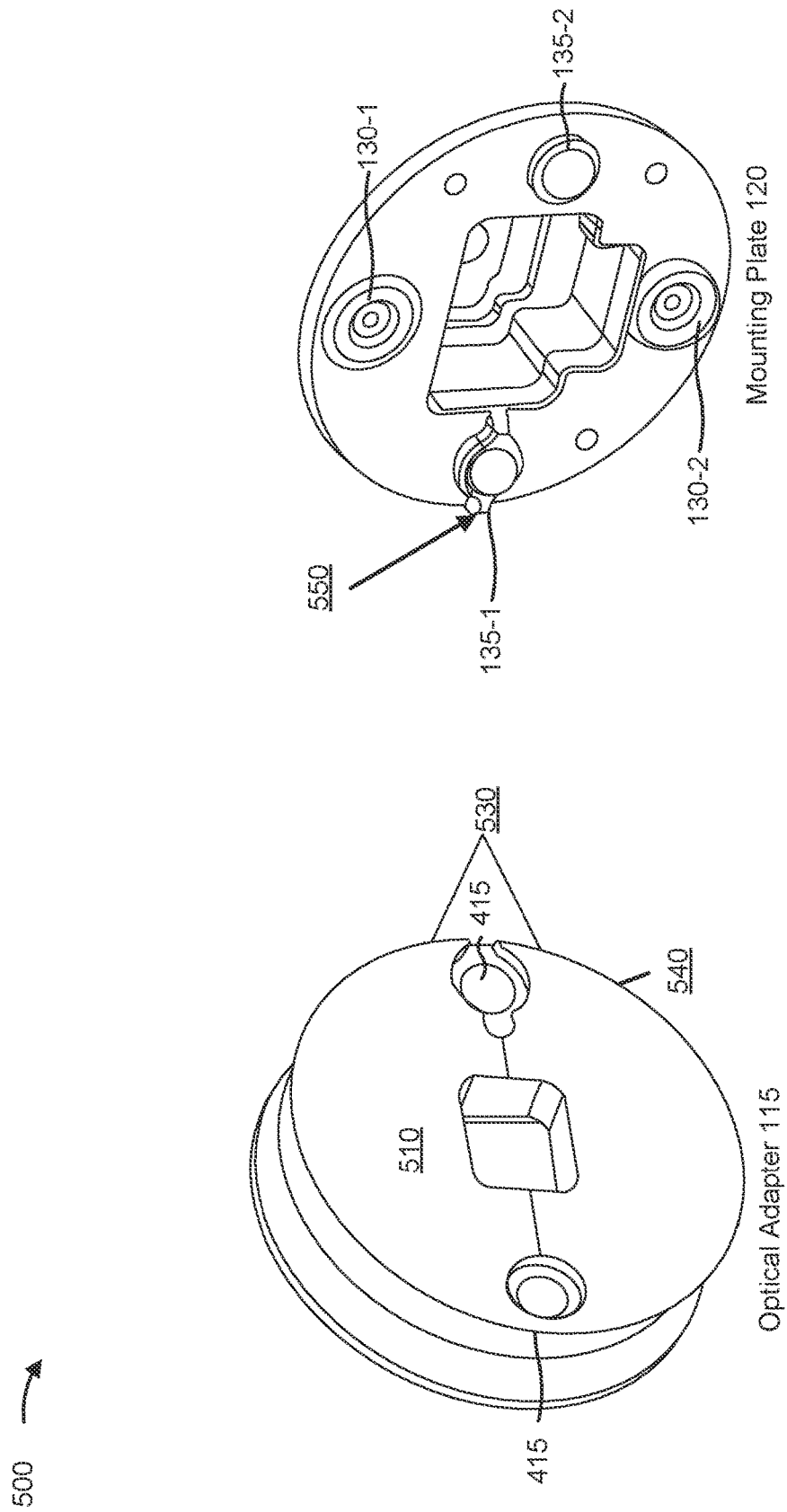
FIG. 5 is a diagram of an example implementation related to an optical adapter system described herein.

FIG. 5 is a diagram of an example implementation 500 related to an optical adapter system described herein. FIG. 5 shows a rear angled view of a back side of an optical adapter 115 and a front angled view of a front side of a mounting plate 120.

As shown in FIG. 5, the back side of the optical adapter 115 may include a metal plate 510 (e.g., similar to the first metal plate described elsewhere herein). In some implementations, the metal plate 510 may be associated with a first position of the optical adapter 115 (e.g., a first position associated with a flat fiber polish). For example, when the metal plate 510 is connected to a first disk magnet 130 (e.g., disk magnet 130-1 shown with respect to the mounting plate 120), then the optical adapter 115 may be in the first position.

As further shown in FIG. 5, the back side of the optical adapter 115 may include a metal plate 520 (e.g., similar to the second metal plate described elsewhere herein). In some implementations, the metal plate 520 may be associated with a second position of the optical adapter 115 (e.g., a second position associated with an angled fiber polish). For example, when the metal plate 520 is connected to a second disk magnet 130 (e.g., disk magnet 130-2 shown with respect to the mounting plate 120), then the optical adapter 115 may be in the second position.

In some implementations, and as shown by reference number 530, the metal plate 510 and the metal plate 520 may be offset from each other by an angle to facilitate movement between different positions. For example, the metal plate 510 and the metal plate 520 may not be planar with each other to facilitate movement of the optical adapter 115 about an axis.

As shown by reference number 540, the back side of the optical adapter 115 may include a set of key structures associated with the set of metal recesses described elsewhere herein. For example, the set of key structures may include a slot, a groove, hole, and/or the like associated with the set of metal recesses. In some implementations, the set of key structures may facilitate alignment of the optical adapter 115 and the mounting plate 120 with each other. For example, and as shown by reference number 550, the mounting plate 120 may include a corresponding set of key structures associated with the set of sphere magnets 130, which may fit within the set of key structures shown by reference number 540. Continuing with the previous example, the set of key structures shown by reference number 550 may be ridges, pegs, and/or the like depending on a shape of the set of key structures shown by reference number 540.

In some implementations, the sets of key structures shown by reference number 540 and 550 may be located on a different portion of the optical adapter 115 and the mounting plate 120, respectively. Additionally, or alternatively, in practice, there may be additional key structures, fewer key structures, different key structures, or differently arranged key structures than those shown in FIG. 5. Additionally, or alternatively, although the sets of key structures shown by reference numbers 540 and 550 are shown as female-type key structures and male-type key structures, respectively, the optical adapter 115 may include male-type key structures, the mounting plate 120 may include female-type key structures, and/or the optical adapter 115 and the mounting plate 120 may include a combination of male-type key structures and female-type key structures.

As indicated above, FIG. 5 is provided merely as an example. Other examples are possible and may differ from what was described with regard to FIG. 5. In practice, there may be additional components, fewer components, different components, or differently arranged components than those shown in FIG. 5.

Figure 6:
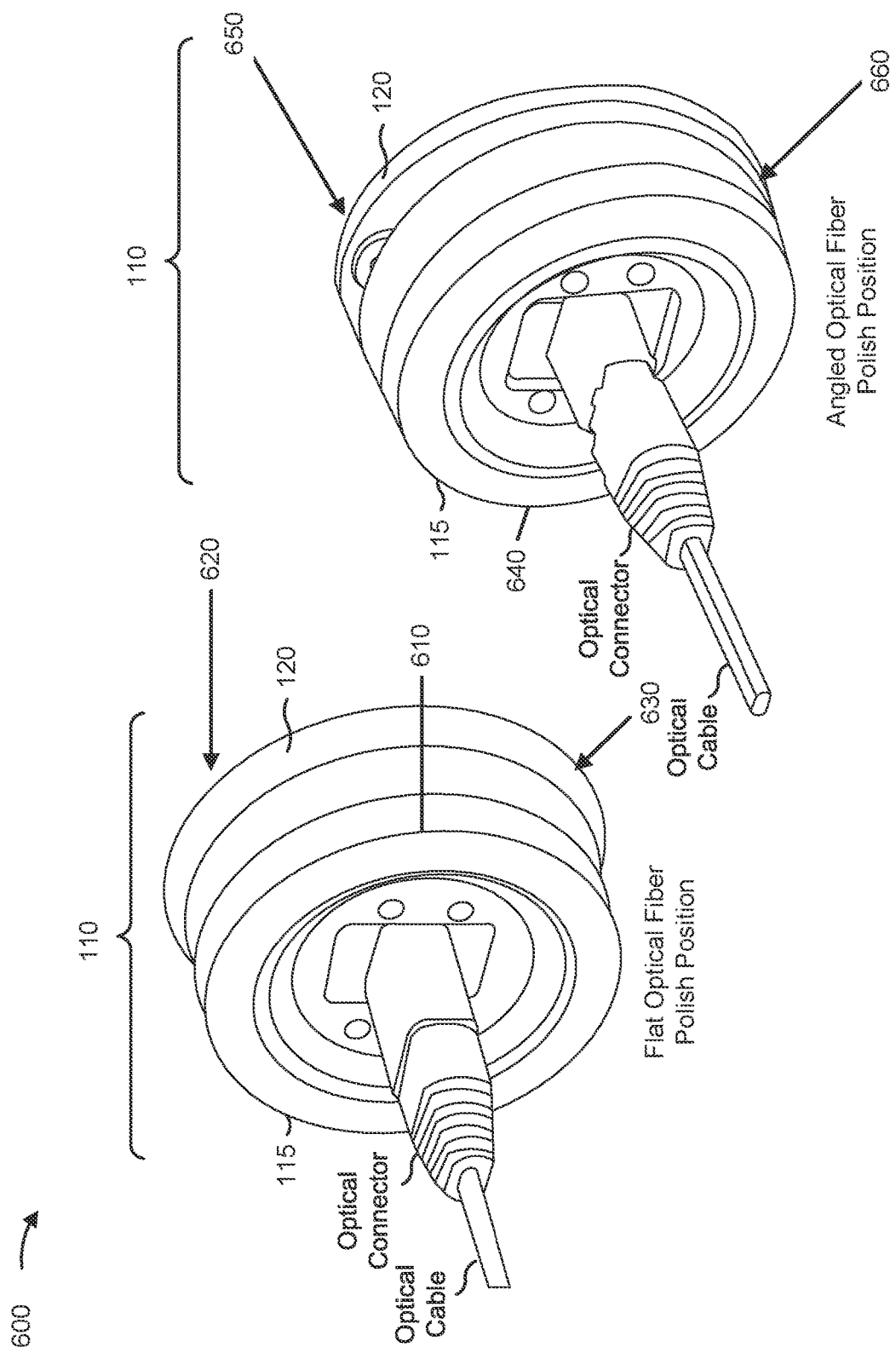
FIG. 6 is a diagram of an example implementation related to an optical adapter system described herein.

FIG. 6 is a diagram of an example implementation 600 related to an optical adapter system described herein. FIG. 6 shows multiple front angled view of optical adapter system 110.

As shown by reference number 610, an optical connector of an optical cable may be mechanically connected to the optical adapter system 110 via an optical tip connector 125 associated with an optical adapter 115 of the optical adapter system 110. As shown by reference number 620, a first metal plate on a back side of the optical adapter 115 (e.g., a metal plate 510 described elsewhere herein) may be connected to a disk magnet 130 of a mounting plate 120 of the optical adapter system 110 (e.g., disk magnet 130-1 described elsewhere herein). As shown by reference number 630, when the optical adapter 115 is in this position (e.g., a first position associated with a flat fiber polish described elsewhere herein), a second metal plate on the back side of the optical adapter 115 (e.g., a metal plate 520 described elsewhere herein) may not be connected to a disk magnet 130

(e.g., disk magnet 130-2) based on an angle by which the first metal plate and the second metal plate are offset from each other.

As shown by reference number 640, a different optical connector of a different optical cable may be connected to the optical adapter system 110 via the optical tip connector 125. As shown by reference number 650, the first metal plate on the back side of the optical adapter 115 may not be connected to a disk magnet 130 of a mounting plate 120 of the optical adapter system 110 (e.g., disk magnet 130-1). As shown by reference number 660, when the optical adapter 115 is in this position (e.g., the second position associated with the angled fiber polish described elsewhere herein), the second metal plate on the back side of the optical adapter 115 (e.g., the metal plate 520 described elsewhere herein) may be connected to a disk magnet 130 (e.g., the disk magnet 130-2) based on the angle by which the first metal plate and the second metal plate are offset from each other.

As indicated above, FIG. 6 is provided merely as an example. Other examples are possible and may differ from what was described with regard to FIG. 6. In practice, there may be additional components, fewer components, different components, or differently arranged components than those shown in FIG. 6.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical adapter system, comprising:
a mounting plate,
wherein the mounting plate includes a set of magnets associated with:
mechanically connecting the mounting plate and an optical adapter of the optical adapter system, and
facilitating movement of the optical adapter between multiple positions associated with different optical fiber polishes,
wherein the multiple positions include:
a first position associated with a first optical fiber polish of the different optical fiber polishes, and
a second position associated with a second optical fiber polish of the different optical fiber polishes,
wherein the first position and the second position are different, and
wherein the first optical fiber polish and the second optical fiber polish are different; and
the optical adapter,
wherein the optical adapter includes a set of structures associated with the set of magnets,
wherein the set of structures includes a recess that receives the set of magnets to facilitate the mechanical connection between the optical adapter and the mounting plate via magnetic connection to the set of magnets,
wherein the optical adapter includes an optical tip connector associated with mechanically connecting the optical adapter system and an optical cable.

2. The optical adapter system of claim 1, wherein the optical adapter system is mechanically connected to an optical cable microscope.

3. The optical adapter system of claim 1, wherein the multiple positions include:
the first position associated with a flat optical fiber polish, and
the second position associated with an angled optical fiber polish.

4. The optical adapter system of claim 1, wherein the set of magnets includes:
a first subset of magnets associated with mechanically connecting the mounting plate and the optical adapter of the optical adapter system, and
a second subset of magnets associated with facilitating movement of the optical adapter between the multiple positions associated with the different optical fiber polishes.

5. The optical adapter system of claim 4, wherein the first subset of magnets includes a set of disk magnets.

6. The optical adapter system of claim 5, wherein the set of disk magnets is recessed within the mounting plate.

7. The optical adapter system of claim 4, wherein the second subset of magnets includes a set of sphere magnets.

8. A mounting plate, comprising:
a set of disk magnets,
wherein the set of disk magnets is associated with mechanically connecting the mounting plate and an optical adapter;
a set of sphere magnets,
wherein the set of sphere magnets is associated with facilitating movement of the optical adapter between multiple positions associated with different optical fiber polishes,
wherein the movement is facilitated via a set of structures, of the optical adapter, that includes a recess that receives the set of sphere magnets to facilitate the mechanical connection between the optical adapter and the mounting plate via magnetic connection to the set of sphere magnets, and wherein the multiple positions include:
a first position associated with a first optical fiber polish of the different optical fiber polishes, and
a second position associated with a second optical fiber polish of the different optical fiber polishes,
wherein the first position and the second position are different, and
wherein the first optical fiber polish and the second optical fiber polish are different; and
a cutout,
wherein the cutout is associated with:
facilitating pass through of an optical connector of an optical cable, or
facilitating analysis of the optical cable by an optical cable microscope.

9. The mounting plate of claim 8, wherein the mounting plate includes a set of key structures associated with facilitating alignment of the mounting plate and the optical adapter.

10. The mounting plate of claim 8, wherein the set of disk magnets includes two disk magnets located on opposite sides of the cutout.

11. The mounting plate of claim 10, wherein the set of sphere magnets include two sphere magnets located on opposite sides of the cutout and perpendicular to the two disk magnets.

12. The mounting plate of claim 8, wherein the multiple positions are associated with a flat optical fiber polish or an angled optical fiber polish.

13. The mounting plate of claim 8, wherein the set of sphere magnets includes a set of sphere magnets or a set of cylinder magnets.

14. The mounting plate of claim 8, wherein the mounting plate is mounted on the optical cable microscope.

15. An optical adapter, comprising:
a set of metal plates,
wherein the set of metal plates is associated with magnetically connecting the optical adapter and a mounting plate;
a set of metal recesses,
wherein the set of metal recesses is associated with facilitating movement of the optical adapter, via receiving a set of magnets of the optical adapter to facilitate a mechanical connection between the optical adapter and the mounting plate via the magnetic connection to the set of magnets, between multiple positions associated with different optical fiber polishes,
wherein the multiple positions include:
a first position associated with a first optical fiber polish of the different optical fiber polishes, and
a second position associated with a second optical fiber polish of the different optical fiber polishes,
wherein the first position and the second position are different, and
wherein the first optical fiber polish and the second optical fiber polish are different; and
an optical tip connector,
wherein the optical tip connector is associated with mechanically connecting the optical adapter and an optical cable.

16. The optical adapter of claim 15, wherein the optical tip connector is interchangeable with one or more other optical tip connectors.

17. The optical adapter of claim 15, wherein a metal plate, of the set of metal plates, is angled to facilitate movement of the optical adapter between the multiple positions associated with the different optical fiber polishes.

18. The optical adapter of claim 15, wherein the optical adapter includes a set of key structures associated with facilitating alignment of the optical adapter and the mounting plate.

19. The optical adapter of claim 15, wherein the optical adapter is connected to the mounting plate via the set of metal plates and the set of metal recesses.

20. The optical adapter of claim 15, wherein the movement of the optical adapter between the multiple positions associated with the different optical fiber polishes is facilitated using rounded surfaces of the set of magnets.

* * * * *